Patented Oct. 20, 1925.

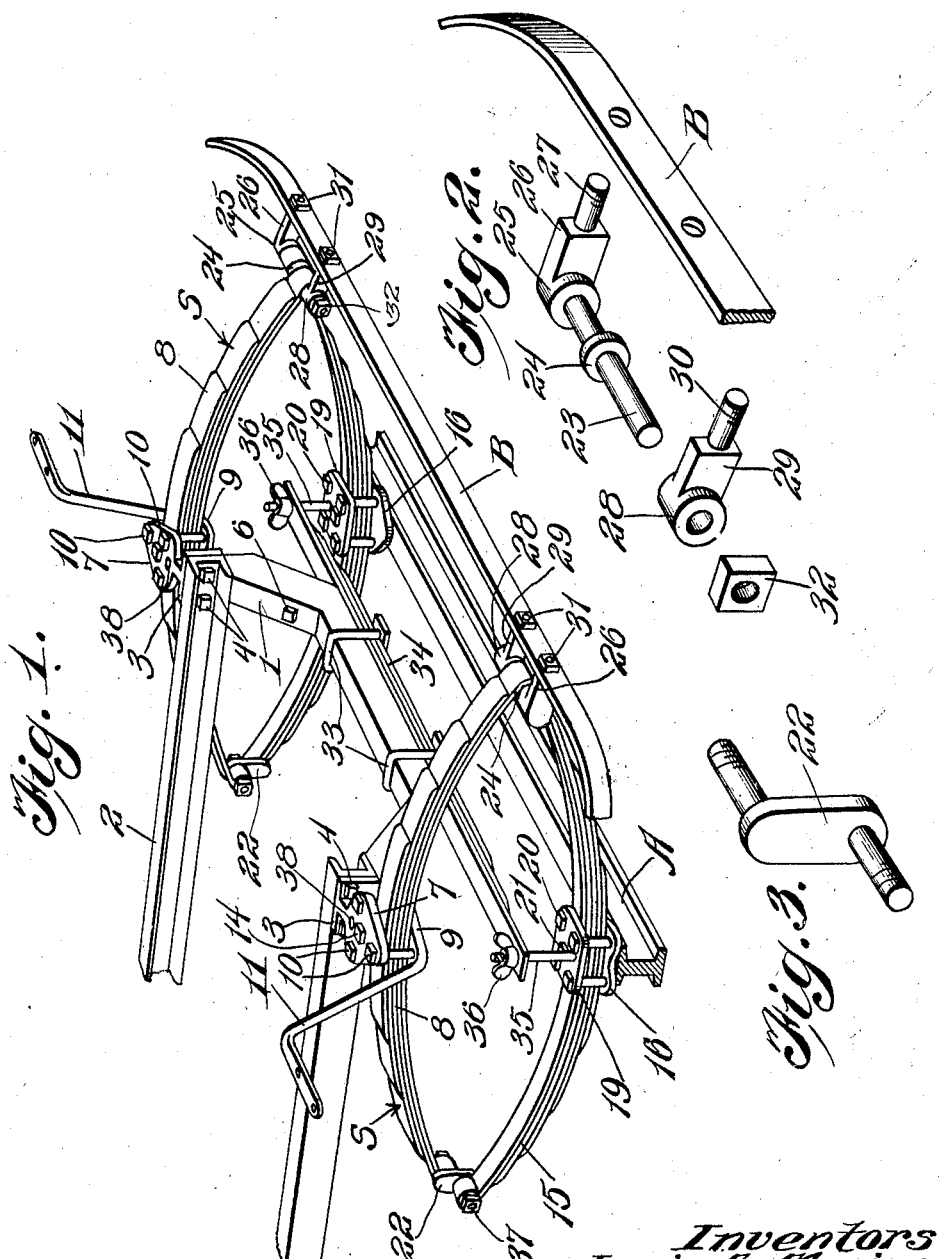

1,558,388

UNITED STATES PATENT OFFICE.

LOUIS A. MORINES AND JAMES T. HARCHARIK, OF WILKES-BARRE, PENNSYLVANIA.

VEHICLE SPRING GEAR.

Original application filed November 13, 1924, Serial No. 749,700. Divided and this application filed April 4, 1925. Serial No. 20,722.

*To all whom it may concern:*

Be it known that we, LOUIS A. MORINES and JAMES T. HARCHARIK, citizens of the United States, residing at Wilkes-Barre, in the county of Luzerne and State of Pennsylvania, have invented certain new and useful Improvements in Vehicle Spring Gears, of which the following is a specification, reference being had to the accompanying drawings, the same being a division of our pending application Serial No. 749,700, filed November 13, 1924.

This invention relates to certain improvements in vehicle spring gears and has relation more particularly to a device of this general character especially designed and adapted for use in connection with the well-known Ford automobile, and is a division of our pending application Serial No. 749,700, filed November 13, 1924. It therefore is an object of the invention to provide a device of this general character which may be readily applied without the necessity of any material structural changes being made in the chassis or axle of the vehicle.

It is also an object of the invention to provide a novel and improved device of this kind which operates effectively to stabilize or balance the vehicle in transit to assure easier riding.

An additional object of the invention is to provide a device of this general character embodying novel and improved means whereby a standard type of full elliptic spring may be employed in connection with the well-known Ford automobile.

A still further object of the invention is to provide a novel and improved gear of this character wherein is included means operating as a snubber to facilitate the riding action of the vehicle.

Furthermore, it is an object of the invention to provide a brace or reinforcing member connecting the full elliptic springs at the end of a car, said member being capable of service as a bumper.

The invention consists in the details of construction and in the combination and arrangement of the several parts of our improved vehicle spring gear whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a fragmentary view in perspective illustrating a vehicle spring gear constructed in accordance with an embodiment of our invention:

Figure 2 is a fragmentary view in perspective of the brace or stay member associated with a pair of springs, with connecting means associated therewith in separated relation;

Figure 3 is a view in perspective of a shackle bolt for connecting the inner extremities of the members of a spring.

As disclosed in the accompanying drawings, 1 denotes an end cross member connecting the side members 2 of the frame of an automobile chassis, said members 1 and 2 being of a character employed in the well-known Ford automobile.

A bracket 3 is connected by the bolts 4 or the like with the extremity of each of the members 2, also by a bolt 6 as particularly disclosed in our pending application Serial No. 749,700.

The upper portion of the bracket 3 is provided with an outstanding plate 7 herein disclosed as substantially in the form of an equilateral triangle with its apex outwardly directed. This plate 7 is adapted to have engaged therewith from below a central portion of the top member 8 of an elliptical spring S. Underlying said portion of the top member 8 is a second plate 9 which coacts with the plate 7 through the medium of the bolts 10 to effectively secure said top member 8 of the spring S to a side member 2.

The plate 9, as herein disclosed, is also substantially in the form of an equilateral triangle with its apex outwardly directed and with said apex portion having integrally formed therewith an upstanding fender brace 11. By having the brace 11 integral with the plate 9 a fender is effectively supported in applied position with a maximum of rigidity.

The plates 7 and 9 have disposed therethrough a bolt 14 also passing through the top section 8 of the spring to further insure the proper mounting of such upper section 8.

The lower member 15 of each of the springs S rests upon a plate 16 positioned upon the axle A, said plate being provided with the depending bolt 17. Resting from above on the central part of the lower member 15 of the spring S is the plate 19 held in requisite clamping engagement with the member 16 by the bolts 20. Disposed through the plates 16 and 19 and through the lower member 15 of the spring S is the spring bolt 21 for further insuring the requisite mounting of said lower member 15.

The members 8 and 15 of the spring S are laterally offset one with respect to the other. The inner extremities of the members 8 and 15 of the spring S are connected in the well-known manner by the shackle bolt 22 and are held in offset position by the holding nuts 37 while the forward end portions of said spring members are connected by the bolt 23 and arranged at opposite sides of the collar 24 integrally formed therewith on said bolt. One end portion of the bolt 23 has a sleeve 25 provided with a forward extension 26 continued by a shank 27 adapted to be disposed through an end portion of a brace or stay member B.

Removably engaged with the opposite end portion of the bolt 23 is a sleeve 28 which has a forwardly directed extension 29 continued by a shank 30 which is also adapted to be disposed through the brace or stay member B. The shanks 27 and 30 when operatively engaged with the member B extend therebeyond and have engaged with such extended portions the holding nuts 31. The sleeve 28 is arranged outwardly of the adjacent spring section and is held in applied position by the holding nut 32. The brace or stay member B serves to maintain the pair of springs S with which it is engaged against lateral movement and otherwise effectively maintains the same in desired assembled relation.

As disclosed in the accompanying drawings, the member B extends outwardly beyond the springs S whereby it may also be employed to advantage as a bumper.

Underlying the central portion of the cross member 1 and clamped thereto, as at 33, is a spring member 34. This spring member 34 is of a length to have each of its end portions extend between the sections 8 and 15 of a spring S. Disposed through such extremity is an upstanding bolt 35 which has threaded thereon a wing nut 36 which contacts with said extremity of the spring member 34 from above. By proper manipulation of the nut 36 the tension of the spring member 34 may be adjusted as the occasions of practice may prefer.

This spring member 34 operates effectively to further absorb the shocks imposed upon the chassis of the vehicle incident to travel whereby easy riding is further assured. This spring 34 also operates to balance or stabilize the action of the main spring S.

Our improved vehicle spring gear may be applied in working position with convenience and facility and without material expense and when in use results in a light car such as the well-known Ford automobile travelling with substantially the same ease and comfort as the larger cars.

Each of the plates 7 is also provided with an opening 38 in which is insertible a headlight brace.

From the foregoing description it is thought to be obvious that a vehicle spring gear constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with a vehicle body and an axle, elliptical springs interposed therebetween, means for securing the springs to the frame and axle, said springs being disposed in a direction lengthwise of the frame, and a brace member connecting the forward ends of the springs.

2. In combination with a vehicle frame and an axle, elliptical springs interposed therebetween, an outstanding plate carried by each side of the frame and overlying the upper member of an elliptical spring, a second plate underlying said member of the spring, means for clamping said member of the spring between the plates, and a fender brace carried by the second plate.

3. In combination with a vehicle frame and an axle, elliptical springs interposed therebetween and extending in a direction lengthwise of the frame, means for connecting said springs to the frame and to the axle, the upper and lower members of each of the springs being offset one with respect to the other, bolts connecting the extremities of said members of the springs, a brace member for the outer ends of the springs, and means carried by the outer connecting bolts of the springs for connecting said bolts to the brace member.

4. In combination with a vehicle frame and an axle, elliptical springs interposed therebetween and extending in a direction lengthwise of the frame, means for connecting said springs to the frame and to the axle, the upper and lower members of each of the springs being off-set one with respect to the other, bolts connecting the extremities of said members of the springs, a brace member for the outer ends of the springs, and means carried by the outer connecting bolts of the springs for connecting said bolts to the brace member, each of the bolts being provided with a collar interposed between the extremities of the spring engaged with said bolt.

In testimony whereof we hereunto affix our signatures.

LOUIS A. MORINES.
JAMES T. HARCHARIK.